US009521355B2

(12) United States Patent
Endo

(10) Patent No.: US 9,521,355 B2
(45) Date of Patent: Dec. 13, 2016

(54) IMAGE PROCESSING APPARATUS, IMAGE PROCESSING METHOD AND PROGRAM THEREOF

(71) Applicant: Samsung Electronics Co., Ltd, Suwon-si, Gyeonggi-do (KR)

(72) Inventor: Yuki Endo, Yokohama (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 28 days.

(21) Appl. No.: 14/094,888

(22) Filed: Dec. 3, 2013

(65) Prior Publication Data

US 2014/0153895 A1 Jun. 5, 2014

(30) Foreign Application Priority Data

Dec. 4, 2012 (JP) .................................. 2012-265682
Jun. 10, 2013 (KR) ......................... 10-2013-0066171

(51) Int. Cl.
*H04N 5/77* (2006.01)
*H04N 5/783* (2006.01)
*H04N 5/915* (2006.01)

(52) U.S. Cl.
CPC .............. *H04N 5/772* (2013.01); *H04N 5/783* (2013.01); *H04N 5/915* (2013.01)

(58) Field of Classification Search
CPC ........ H04N 5/2356; H04N 5/77; H04N 5/783; H04N 5/2321; H04N 5/23232
USPC .......................... 386/224, 227, 254, 270, 280
See application file for complete search history.

(56) References Cited

U.S. PATENT DOCUMENTS

| 8,346,066 | B2 | 1/2013 | Mizuno et al. | |
|---|---|---|---|---|
| 2007/0195171 | A1* | 8/2007 | Xiao | G06K 9/00228 348/207.99 |
| 2008/0013941 | A1* | 1/2008 | Daley | 396/121 |
| 2008/0068485 | A1* | 3/2008 | Yuyama | 348/333.01 |
| 2010/0040344 | A1* | 2/2010 | Mizuno et al. | 386/68 |
| 2010/0092091 | A1* | 4/2010 | Kanda | A61B 1/041 382/190 |
| 2010/0149369 | A1* | 6/2010 | Yasuda | H04N 5/23219 348/222.1 |
| 2011/0102454 | A1* | 5/2011 | Miyakoshi | H04N 5/232 345/589 |
| 2011/0249143 | A1* | 10/2011 | Tatsumi | H04N 5/2355 348/229.1 |
| 2014/0029843 | A1* | 1/2014 | Obrador Espinosa | G06K 9/00711 382/165 |
| 2015/0109337 | A1* | 4/2015 | Hofmann | G06T 7/0002 345/633 |

FOREIGN PATENT DOCUMENTS

JP        2010-045609        2/2010

* cited by examiner

*Primary Examiner* — Helen Shibru
(74) *Attorney, Agent, or Firm* — Staas & Halsey LLP

(57) ABSTRACT

An image processing apparatus includes a storage unit configured to store a plurality of continuous image frames, and a frame generator configured to obtain a predetermined number of image frames from the plurality of continuous image frames stored in the storage unit and synthesize the predetermined number of image frames to sequentially produce video reproduction frames. The frame generator uses same image frames, which are used to produce one video reproduction frame, to produce another video reproduction frame.

14 Claims, 9 Drawing Sheets

IMAGE PROCESSING APPARATUS, IMAGE PROCESSING METHOD AND PROGRAM THEREOF

CROSS-REFERENCE TO RELATED APPLICATIONS

This application claims priorities under 35 U.S.C. §119(a) from Korean Patent Application No. 10-2013-0066171, filed on Jun. 10, 2013, in the Korean Intellectual Property Office, and Japanese Patent Application No. 2012-265682, filed on Dec. 4, 2012, in the Japanese Patent Office, the disclosure of which are incorporated herein by reference in their entireties.

BACKGROUND OF THE INVENTION

1. Field of the Invention

The present general inventive concept relates to an image processing apparatus, a method of producing the same, and a program thereof.

2. Description of the Related Art

Conventionally, various image synthesis processes have been performed by capturing still images.

For example, a high dynamic range (HDR) image is produced by changing an exposure amount when synthesizing images in a camera. An image having an expanded depth of field may be produced by changing a focal point when synthesizing images using various applications in personal computers. Also, a so-called blurring phenomenon may be controlled by changing an aperture value during image synthesizing.

Recently, such image synthesis techniques have been also employed in a field of video production. For example, Patent Document 1 (Japanese Unexamined Patent Publication No. 2010-45609) has suggested a method of producing one video reproduction frame by synthesizing a plurality of captured frames.

However, in the method disclosed in Patent Document 1, a plurality of captured frames are synthesized to produce one video reproduction frame. As such, only one sheet of captured images can be used to produce a maximum of one video reproduction frame, thereby degrading a frame rate of the video reproduction. Although Patent Document 1 suggests that images should be captured at a high speed and frame extension should be then performed on the images in order to secure the frame rate to reproduce video, it is unavoidable that the frame rate to reproduce video is lower than that of captured frames.

SUMMARY OF THE INVENTION

The present general inventive concept provides a device, a method, and a program to support an image processing apparatus, which is capable of producing frames to reproduce video without degrading a frame rate.

Additional features and utilities of the present general inventive concept will be set forth in part in the description, which follows and, in part, will be obvious from the description, or may be learned by practice of the present general inventive concept.

The foregoing and/or other features and utilities of the present general inventive concept are achieved by providing an image processing apparatus that includes a storage unit to store a plurality of continuous image frames, a frame generator to obtain a predetermined number of image frames from the plurality of continuous image frames stored in the storage unit, and synthesize the predetermined number of image frames to sequentially produce video reproduction frames. The frame generator uses same image frames, which are used to produce one video reproduction frame, to produce another video reproduction frame.

In an exemplary embodiment of the present general inventive concept, the frame generator may produce the video reproduction frames using the predetermined number of images frames, in which at least one of an exposure amount, a depth of field, and a focus point, which are image features, is changed.

The image processing apparatus may further include an imaging unit to photograph a subject a plurality of times to obtain the predetermined number of image frames, and an image feature controller to adjust the image features by controlling the imaging unit. The image feature controller may change the image features such that the image features of the video reproduction frames are monotonously changed.

The image feature controller may change the image features such that the image features of the video reproduction frames are continuously changed.

Also, the image feature controller may control exposure amounts of the predetermined number of image frames by changing at least one among an exposure time, gain features, an aperture value, and a neutral density (ND) filter.

The image feature controller may control the depths of field of the predetermined number of image frames by changing an aperture value.

Also, the image feature controller may control focus points of the predetermined number of image frames by controlling a focus lens included in the imaging unit.

Also, when importances are assigned to the predetermined number of image frames, the imaging unit may change a frequency of capturing the predetermined number of image frames according to the importances.

Also, when image information is changed between the predetermined number of image frames to exceed a predetermined threshold, the frame generator may suspend production of the video reproduction frame.

The image processing apparatus may further include a reproduction unit to reproduce the video reproduction frames.

The foregoing and/or other features and utilities of the present general inventive concept may also be achieved by providing an image processing method that includes storing a plurality of continuous image frames, producing video reproduction frames by obtaining a predetermined number of image frames from the plurality of continuous image frames stored, and synthesizing the predetermined number of image frames to sequentially produce the video reproduction frames. The producing of the video reproduction frames may include using same image frames, which are used to produce one video reproduction frame, to produce another video reproduction frame.

The foregoing and/or other features and utilities of the present general inventive concept may also be achieved by providing a non-transitory computer readable recording medium having stored a program code to be executed in a computer, wherein a method performed using the program code includes storing a plurality of continuous image frames, producing video reproduction frames by obtaining a predetermined number of image frames from the plurality of continuous image frames stored, and synthesizing the predetermined number of image frames to sequentially produce the video reproduction frames. The producing of the video reproduction frames includes using same image frames, which are used to produce one video reproduction frame, to produce another video reproduction frame.

The foregoing and/or other features and utilities of the present general inventive concept may also be achieved by providing an image processing apparatus that includes an imaging unit to capture images of a subject and produce image frames corresponding to the captured images, a storage unit to store the image frames, at least one image feature controller to control adjustment of image features of the image frames, and a frame generator to generate a plurality of video reproduction frames from at least one of the image frames such that image features of the video reproduction frames are adjusted to correspond to the adjusted image features of the at least one of the one image frames.

The image processing apparatus may further include the frame generator having a predetermined threshold value to control suspension of video reproduction based on changes of at least one image feature of the image frames during a video reproduction process.

In the image processing apparatus, the image frame, which is used to produce one of the video reproduction frames corresponding to a number of the image frames, may be used to produce another one of the video reproduction frames corresponding to a separate number of the image frames.

In the image processing apparatus, the imaging unit, the image feature controller, the storage unit, and the frame generator may operate in a timely overlapping manner.

The imaging unit of the image processing apparatus may further generate a reference image to allow the frame generator to selectively use the image frames during a video reproduction process by comparing at least one image feature of the image frames to the reference image.

In the image processing apparatus, at least one of the image frames, which is used to produce one of the video reproduction frames, may be flanked by the image frames used to produce another one of the video reproduction frames.

The image feature controller of the image processing apparatus may further adjust the image features including at least one of an exposure amount, a depth of field, and a focus point.

The image feature controller may further control one of the image features to undergo one of the adjustment including an increase, a reduction, and no change, such that the same image feature of the corresponding video reproduction frame may change continuously and monotonously.

As described above, according to the present general inventive concept, image frames are allowed to be repeatedly used, thereby preventing a decrease in a frame rate when video reproduction frames are produced.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
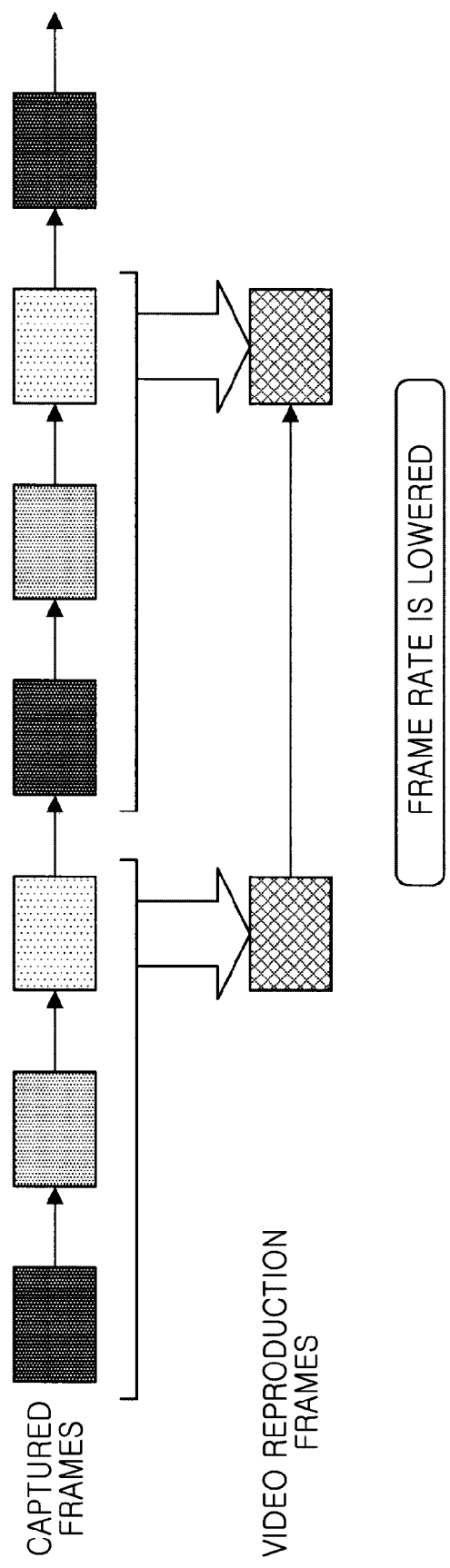
FIG. 1 is a diagram illustrating a conventional image synthesis process performed to produce video.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a diagram illustrating a conventional image synthesis process performed to produce video. Here, an image frame to reproduce video, also referred to as a video reproduction frame, is produced by performing image synthesis, in which HDR images of a subject are captured while changing an exposure amount and are then synthesized to produce a video reproduction frame. In the conventional image synthesis process an image synthesis is performed in units of a predetermined number of captured frames, such as every three sheets of captured frames, therefore, a frame rate of the video reproduction frame that is actually produced is lower than a frame rate of the captured frames.

As illustrated in FIG. 1, in order to prevent a decrease in a frame rate, Patent Document 1 suggests image frames should be captured at a high speed and frame extension should be then performed on the image frames to secure a frame rate to reproduce video. However, it is unavoidable that the frame rate of the video reproduction frame is lower than the frame rate of the image frames.

The present general inventive concept may produce a video reproduction frame without causing a decrease in a frame rate of the video reproduction.

Figure 2:
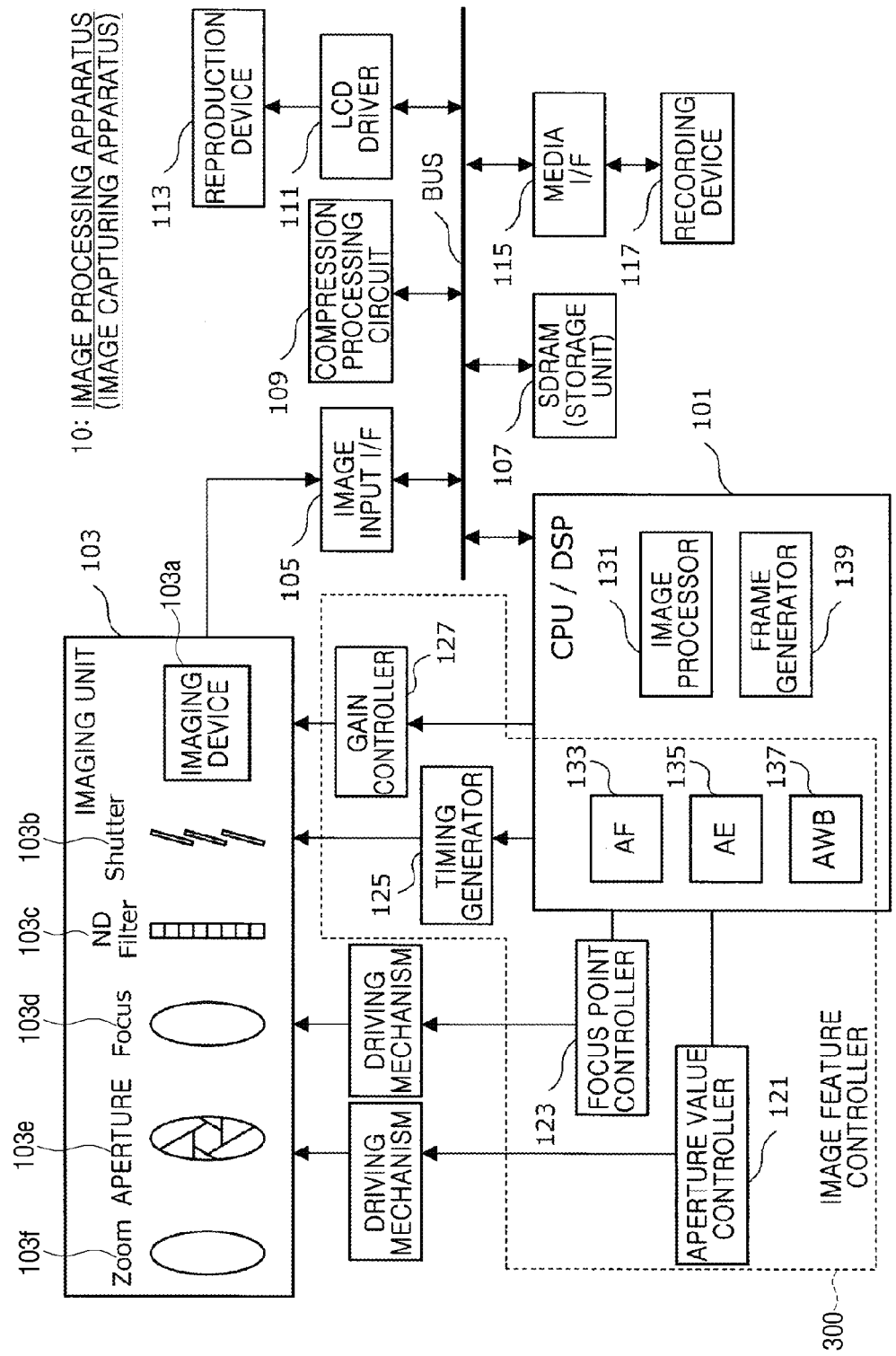
FIG. 2 is a block diagram of an image processing apparatus according to an exemplary embodiment of the present general inventive concept.

FIG. 2 is a block diagram illustrating a structure of an image processing apparatus 10 having a function of capturing an image of a subject according to an exemplary embodiment of the present general inventive concept.

Referring to FIG. 2, the image processing apparatus 10 includes a central processing unit (CPU)/digital signal processor (DSP) 101, an imaging unit 103, an image input interface (I/F) 105, a synchronous dynamic random access memory (SDRAM) 107 as a storage unit, a compression processing circuit 109, a liquid crystal display (LCD) driver 111, a reproduction device 113, a media I/F 115, a recording device 117, an aperture value controller 121, a focus point controller 123, a timing generator 125, a gain controller 127, and driving mechanisms such as a motor or an actuator, but may not be limited thereto. The CPU/DSP 101, the image input I/F 105, the SDRAM 107, the compression processing circuit 109, the LCD driver 111, and the media I/F 115 are connected via an internal bus to exchange signals with one another.

The CPU/DSP 101 may function as an arithmetic processing device and a control device, and control overall or some operations performed in the image processing apparatus 10, based on various programs recorded in the SDRAM 107 or another memory/storage unit (not illustrated). Also, the CPU/DSP 101 may perform image processing on an image, such as an image captured by the imaging unit 103, but is not limited thereto.

As illustrated in FIG. 2, the CPU/DSP 101 includes an image processor 131, an auto focus (AF) unit 133, an auto exposure (AE) unit 135, an auto white balance (AWB) unit 137, and a frame generator 139.

The image processor 131 is a processor configured to perform image processing on an image captured by the imaging unit 103, output from an imaging device 103a included in the imaging unit 113, and input via the image input I/F 105. The captured image processed by the image processor 131 is then stored in the SDRAM 107 functioning as a storage unit.

The imaging unit 103 may include a lens group further including a shutter 103b, an ND filter 103c, a focus 103d, an aperture 103e, and a zoom 103f, but is not limited thereto.

The AF unit 133 detects a distance between the image processing apparatus 10 and a subject based on information regarding a captured image output from the imaging device 103a, and adjusts a focal distance by driving a focus lens 103d included in the imaging unit 103 using the focus point controller 123. As described above, the AF unit 133 also functions as a focus controller configured to control focusing in the imaging unit 103.

The AE unit 135 calculates and obtains an appropriate exposure value to capture an image based on brightness information of a captured image output from the imaging device 103a. The brightness information may include information regarding a brightness value of an image of a subject (captured image).

Also, the AE unit 135 may control the aperture 103e using the aperture value controller 121, and may control the shutter 103b via the timing generator 125, so that an exposure value of an image signal obtained by the imaging device 103a is equal to a calculated appropriate exposure value.

Also, the AE unit 135 calculates a gain corresponding to an image signal and controls amplification of the image signal using the gain controller 127, based on the calculated appropriate exposure value. As described above, the AE unit 135 may function as an exposure amount controller to control an exposure value of the imaging unit 103.

The AWB unit 137 calculates a white balance gain and controls adjustment of the white balance of the imaging unit 103 using the gain controller 127, based on the calculated appropriate white balance gain of a captured image output from the imaging device 103a.

As described above, the aperture value controller 121, the focus point controller 123, the timing generator 125, the gain controller 127, the AF unit 133, the AE unit 135, and the AWB unit 137 may function as an image feature controller 300, respectively, to control various image features of an image captured by the imaging unit 103.

The frame generator 139 produces a video reproduction frame using captured frames, which are images captured by the imaging unit 103 to produce a video. The captured frames are image-processed by the image processor 131 and stored in the storage unit SDRAM 107.

The imaging unit 103 causes light from a subject to be incident on a light-receiving surface of the imaging device 103a under control of the CPU/DSP 101 or the image feature controllers 300. Thus, the light incident on the light-receiving surface of the imaging device 103a is converted into an electrical signal, thereby obtaining a captured image.

The captured frame, which is produced by the imaging unit 103, is input to the CPU/DSP 101 via the image input I/F 105.

The image input I/F 105 is an interface via through which actual data of the captured frame corresponding to an image captured by the imaging unit 103 is input from the imaging unit 103 to a main body of the image processing apparatus 10.

In an exemplary embodiment of the present general inventive concept, the SDRAM 107 is an example of a storage unit included in the image processing apparatus 10. The SDRAM 107 stores image signals, that can be converted to image data to perform further image processing in a predetermined format by the CPU/DSP 101.

The compression processing circuit 109 is a process circuit configured to convert image data including those stored in the SDRM 107 but are not limited thereto, in a predetermined compressed data format to perform further image processing performed by the CPU/DSP 101.

The LCD driver 111 is a driver configured to drive an LCD that is a display device functioning as the reproduction device 113.

In an exemplary embodiment of the present general inventive concept, the reproduction device 113 is mounted in the image processing apparatus 10, which is an image capturing apparatus.

The LCD driver 111 drives the reproduction device 113 to display image data stored in the SDRAM 107 or the recording device 117 on a display screen (not illustrated). Thus, a user is capable of directly viewing a produced video reproduction frame. The reproduction device 113 that displays image data is not limited to the LCD or any other display devices.

The media I/F 115 is a driver to drive various recording media including the recording device 117 as an external recording device, but may not be limited thereto. The media I/F 115 may write various data to the recording device 117.

Also, the media I/F 115 may read various data from the recording device 117. In an exemplary embodiment of the present general inventive concept, the media I/F 115 may write image data to the recording device 117, or read image data from the recording device 117 causing the read image data to be displayed on the reproduction device 113. The recording device 117 may be any of various external storage devices, and may not be limited to a particular type.

FIGS. 3 through 9 illustrate a process of producing and processing video reproduction frames performed by the frame generator 139 of the CPU/DSP 101 according to an exemplary embodiment of the present general inventive concept.

The frame generator 139 obtains a predetermined number of image frames from a plurality of captured frames stored in the SDRAM 107 as a storage unit, and synthesizes the predetermined number of image frames to sequentially produce video reproduction frames. The frame generator 139 performs image synthesis by allowing same image frames, which are used to produce one video reproduction frame, to be used to produce another video reproduction frame. As a result, the video reproduction frames may be produced at the same frame rate as the captured frames.

Figure 3:
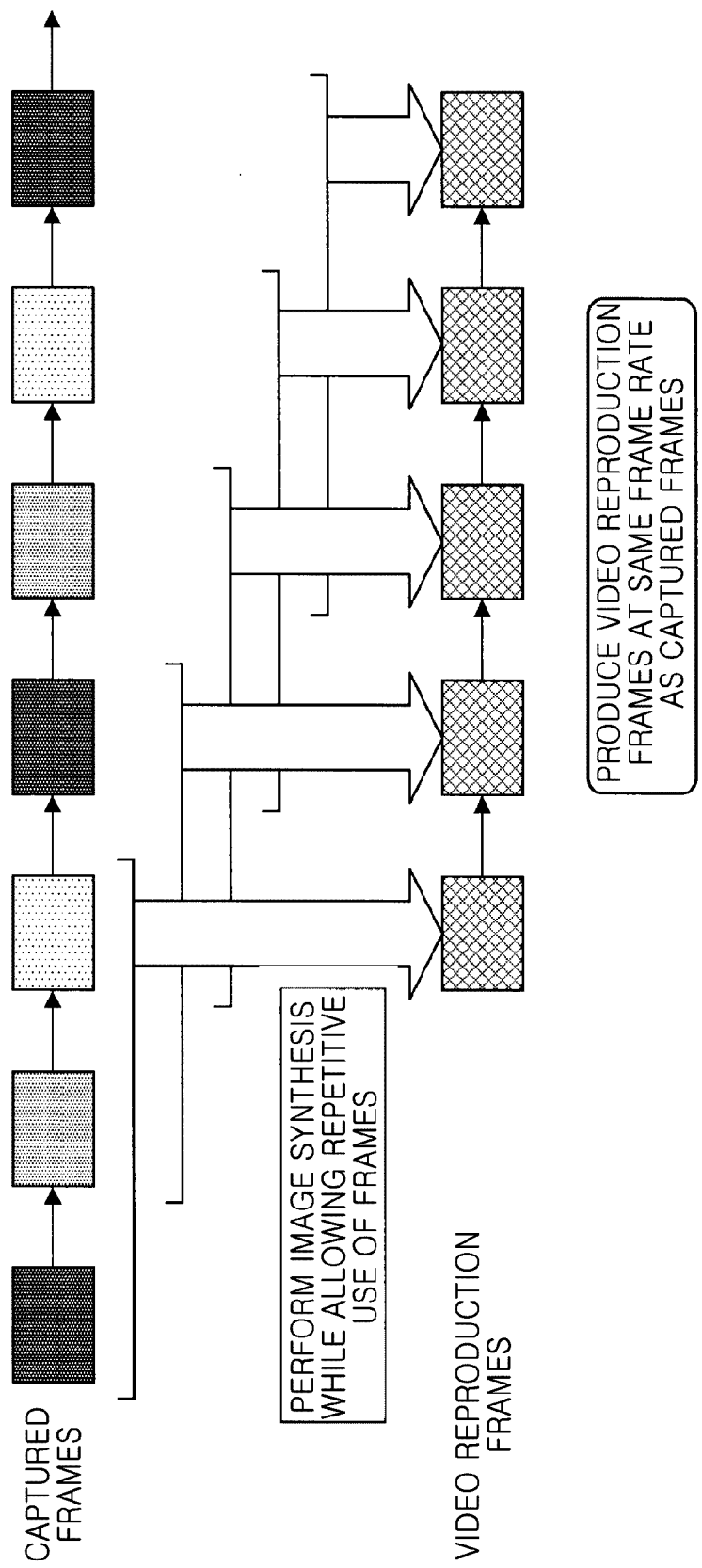
FIGS. 3 through 9 are diagrams illustrating methods of producing and processing video reproduction frames according to various exemplary embodiments of the present general inventive concept.

As illustrated in FIG. 3, according to an exemplary embodiment of the present general inventive concept, a video reproduction frame is produced using three sheets of captured frames. The frame generator 139 sequentially produces video reproduction frames while overlapping image frames to be used, and thus allows a repetitive use of the captured frames. Referring to FIG. 3, since every two sheets of captured frames are repeatedly used while being overlapped, video reproduction frames can be produced at the same frame rate as the captured frames.

The number of sheets of captured frames used to reproduce video reproduction frames may be determined according to a quality of an image, from which video reproduction frames are produced, but may not be limited to a particular number.

Also, the frame generator 139 may produce video reproduction frames using image frames obtained by changing at least one image feature among an exposure amount, the depth of field, and a focus point thereof. Thus, the frame generator 139 may produce video reproduction frames such that at least one feature of the exposure amount, the depth of field, and the focus point is changed. Such captured images with at least one changed image feature may be separately captured by any of imaging devices, or may be obtained by photographing a subject a plurality of times using the imaging unit 103 of the image processing apparatus 10 of FIG. 2, but may not be limited thereto.

As illustrated in FIG. 2, when the image processing apparatus 10 includes the imaging unit 103 and various image feature controllers 300, the frame generator 139 may photograph a subject a plurality of times in association with the various image feature controllers and the imaging unit 103. The various image feature controllers 300 change image features of obtained captured frames by controlling the imaging unit 103 to monotonously and preferably, continuously, change image features of video reproduction frames. Thus, the image features of the video reproduction frames may be changed such that viewers will not feel a sense of incompatibility during reproduction of these frames.

At least one of the various image feature controllers 300 may control an exposure amount of an image frame by changing at least one among an exposure time, gain features, an aperture value, and a neutral-density (ND) filter thereof, but may not be limited thereto, to control an exposure amount of a video reproduction frame.

Also, one of the various image feature controllers 300 may control the depth of field of an image frame by controlling the aperture 103e included in the imaging unit 103 through the aperture value controller 121, thereby controlling the depth of field of a video reproduction frame.

Also, one of the various image feature controllers 300 may control a focus point of a captured frame by controlling the focus lens 103d included in the imaging unit 103 through the focus point controller 123, thereby controlling a focus point on a video reproduction frame.

FIGS. 4 through 7 illustrate a process, by which a video reproduction frame is produced with an exposure amount adjusted either automatically under an automatic exposure (AE) function, or per a user's instruction.

When a video reproduction frame is produced while one of image features is being changed, such as an exposure amount, but is not limited thereto, the frame generator 139 captures images of a subject using the imaging unit 103 in association with the AE unit 135 or the aperture value controller 121.

Figure 4:
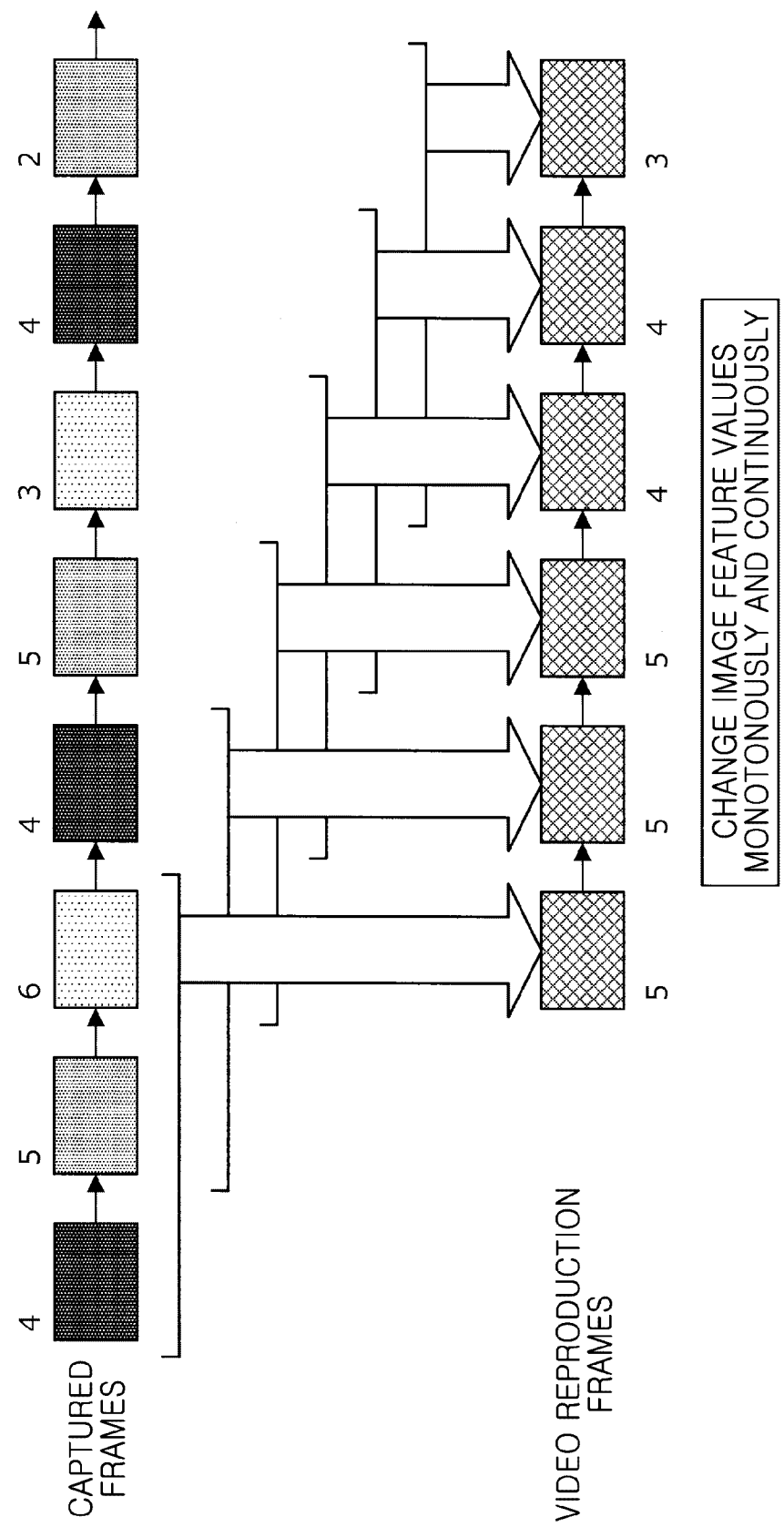

FIG. 4 illustrates a method of producing and processing frames when the brightness of video reproduction frames is to be reduced, i.e., when an exposure amount is to be reduced.

In FIG. 4, the frame generator 139 produces one video reproduction frame from three sheets of captured frames, each of which may have a different brightness, denoted by a number located on top of the corresponding captured frame. Brightness of a video reproduction frame obtained from the above three captured frames is denoted by a number located below a bottom of the corresponding video reproduction frame.

The frame generator 139 controls capturing images of a subject in association with the AE unit 135 or the aperture value controller 121 such that the brightnesses of video reproduction frames to be produced are monotonously, and preferably, continuously reduced.

In an exemplary embodiment of the present general inventive concept, when the brightness of video reproduction frames that are to be produced is equal to an average of those of captured frames that are to be used to produce the video reproduction frames, the frame generator 139 controls an image feature controller 300 to control an exposure amount of the captured frames by estimating the brightness of the video reproduction frames to be produced.

Referring to FIG. 4, in a first image synthesis performed by the frame generator 139, three captured frames having brightness 4, brightness 5, and brightness 6, respectively, are used, and an average of the brightnesses of the captured frames is 5. In a second image synthesis, three captured frames having brightness 5, brightness 6, and brightness 4, respectively, are used, and an average brightness of the captured frames is 5. In a third image synthesis, three captured frames having brightness 6, brightness 4, and brightness 5, respectively, are used, and an average brightness of the captured frame is 5. Thus, the frame generator 139 controls an exposure amount to cause a sixth captured frame, which is to be used in a fourth image synthesis, to have brightness of 3 so that a video reproduction frame that is to be produced in the fourth image synthesis may have a brightness of 4.

By performing such processing, the frame generator 139 may produce video reproduction frames such that the image feature values representing brightness of which are monotonously and continuously changed as illustrated in a lower portion of FIG. 4.

Figure 5:
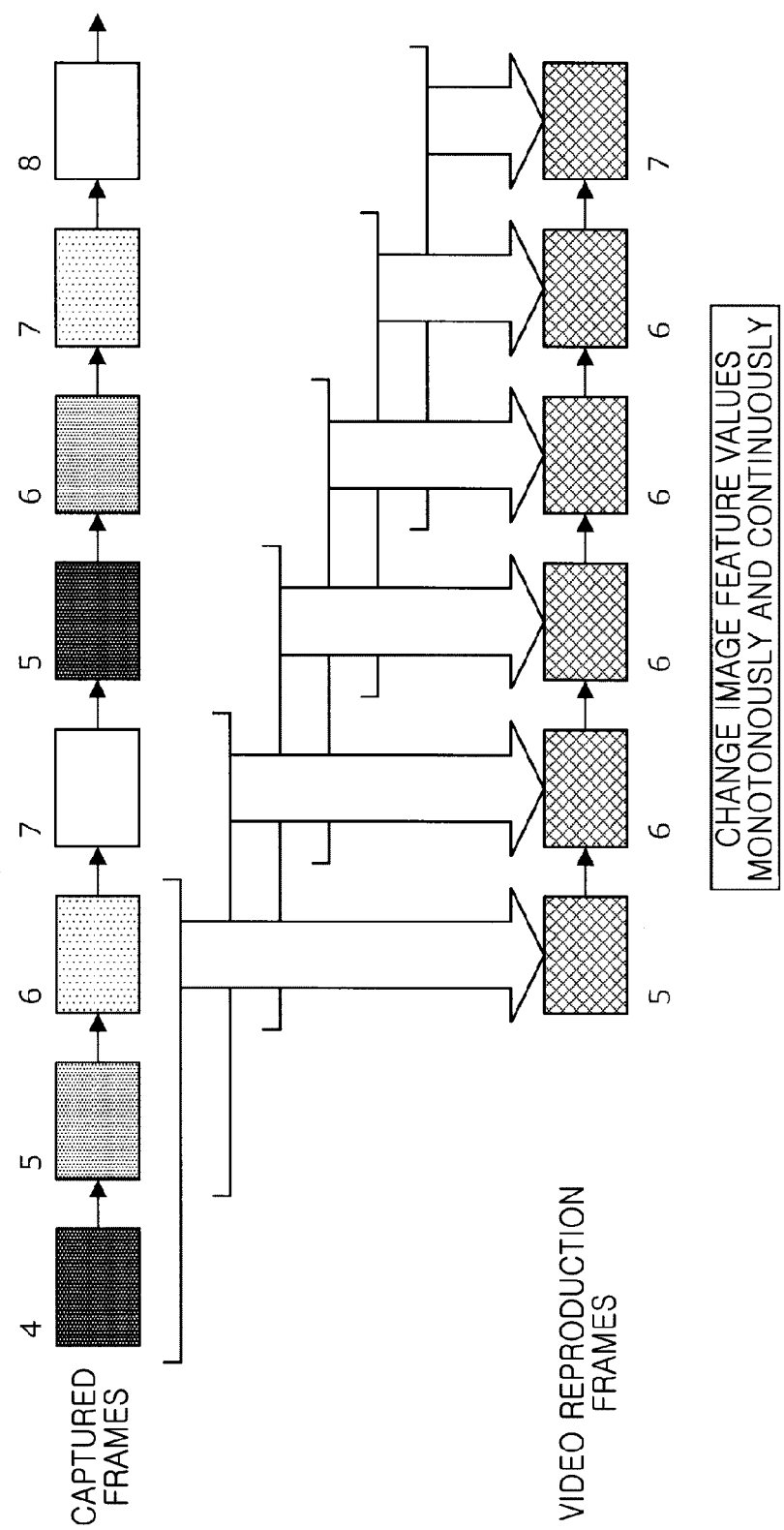

FIG. 5 illustrates a method of producing and processing frames when the brightnesses of video reproduction frames are to be increased, meaning that an exposure amount of the video reproduction frames is to be increased. Exposure control is also performed to produce video reproduction frames, of which the image feature values are monotonously and continuously changed, similar to the method illustrated in FIG. 4.

Processing methods illustrated in FIGS. 4 and 5 may be similarly performed when the number of sheets of captured frames to be used to produce video reproduction frames is not three.

Figure 6:
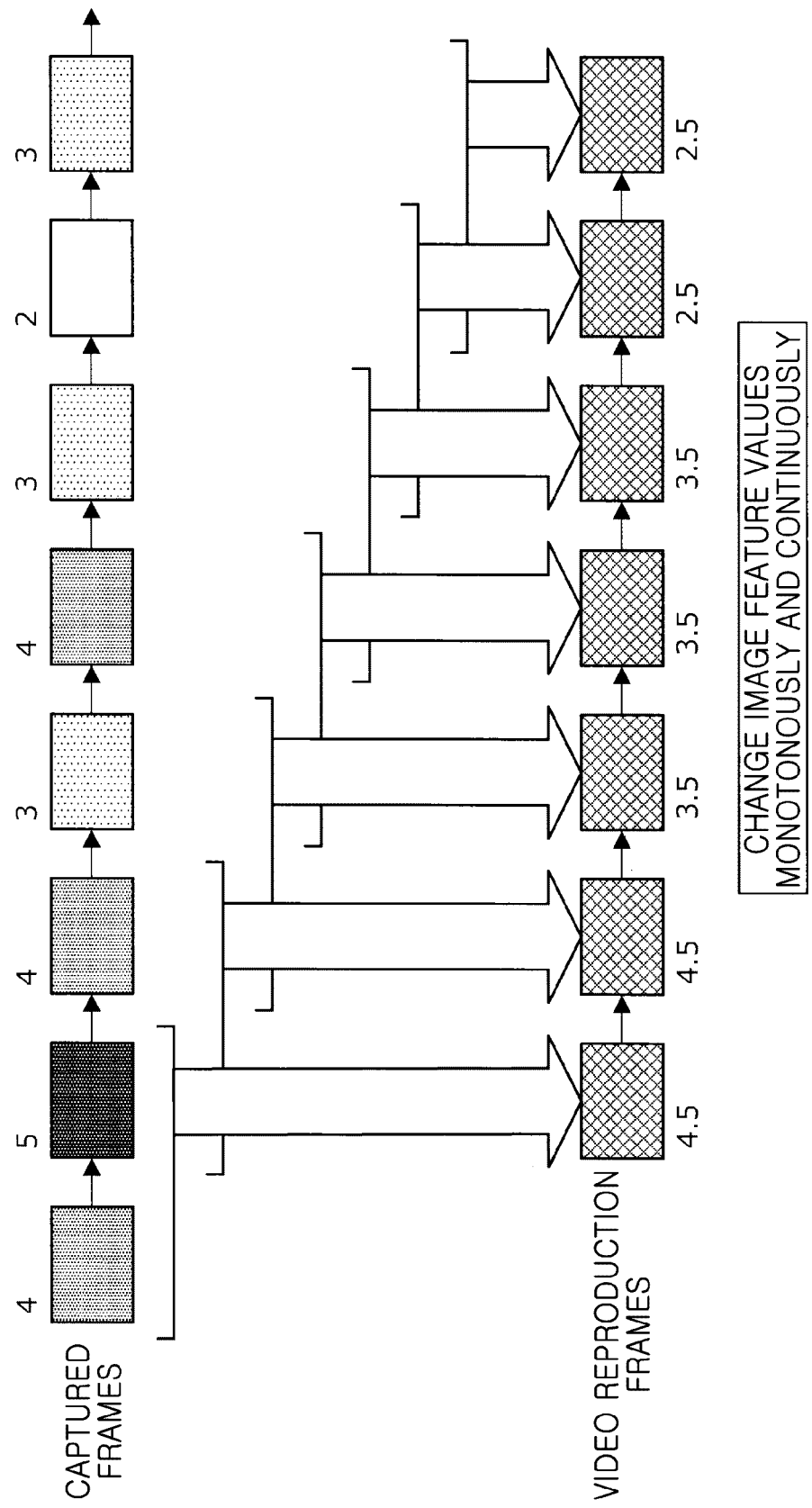
Figure 7:
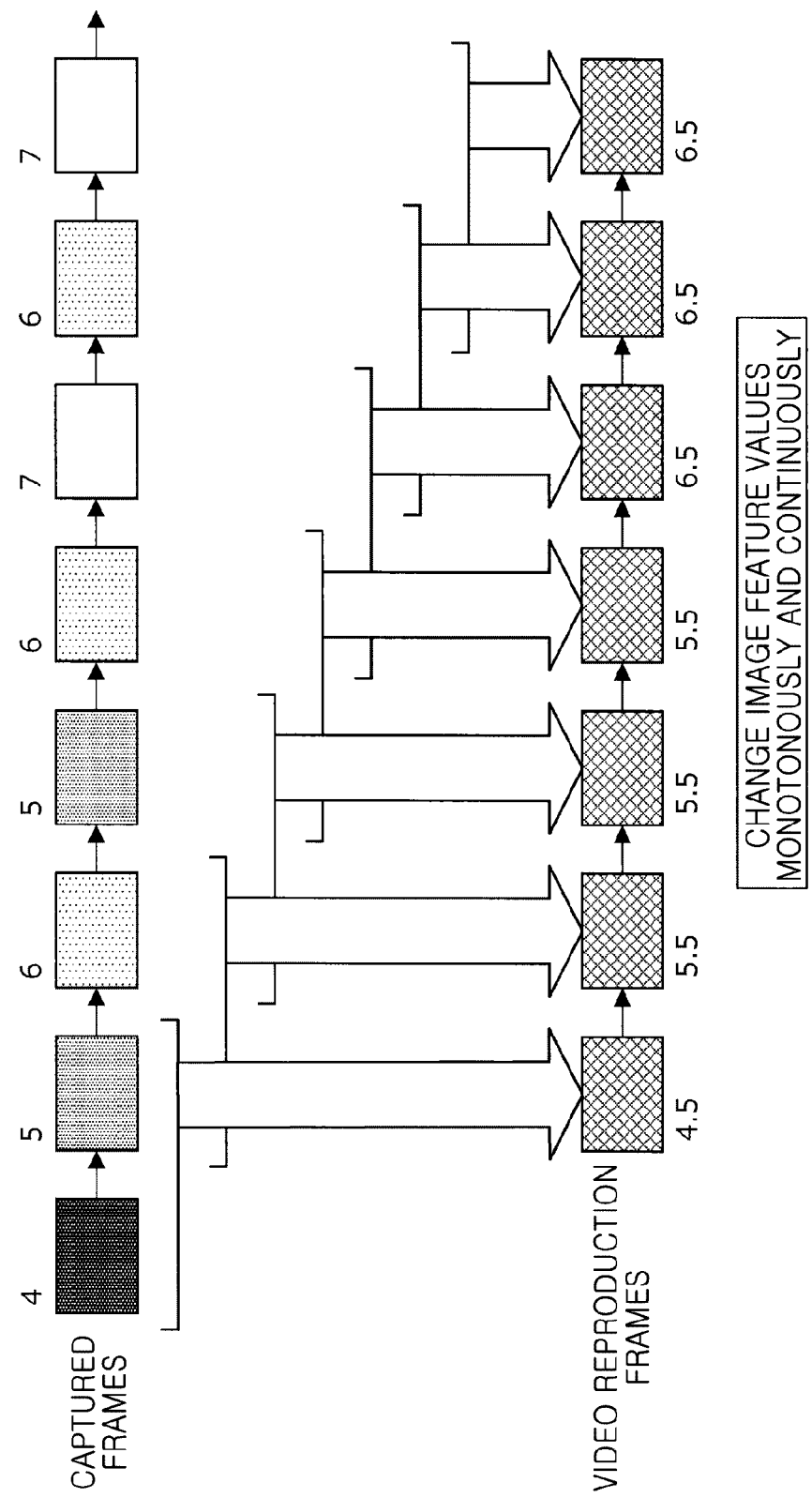

FIGS. 6 and 7 illustrate a method by which brightness control is performed when a video reproduction frame is to be produced using two sheets of captured frames. The image feature values of the video reproduction frames are monotonously and continuously changed similarly as those illustrated in FIGS. 4 and 5.

Video reproduction frames may also be produced by controlling a depth of field or a focus point based on estimating the depths of field or the focus points, of video reproduction frames to be produced, respectively. The depths of field or the focus points of the video reproduction frames to be produced may be monotonously and continuously changed in a way similar to that of an exposure amount.

Also, when importances are assigned to image frames according to image features thereof, the imaging unit 103 may change the frequency of capturing the image frames according to the assigned importances under a control of the CPU/DSP 101. Thus, the number of image frames to be used for image synthesis may be reduced.

Figure 8:
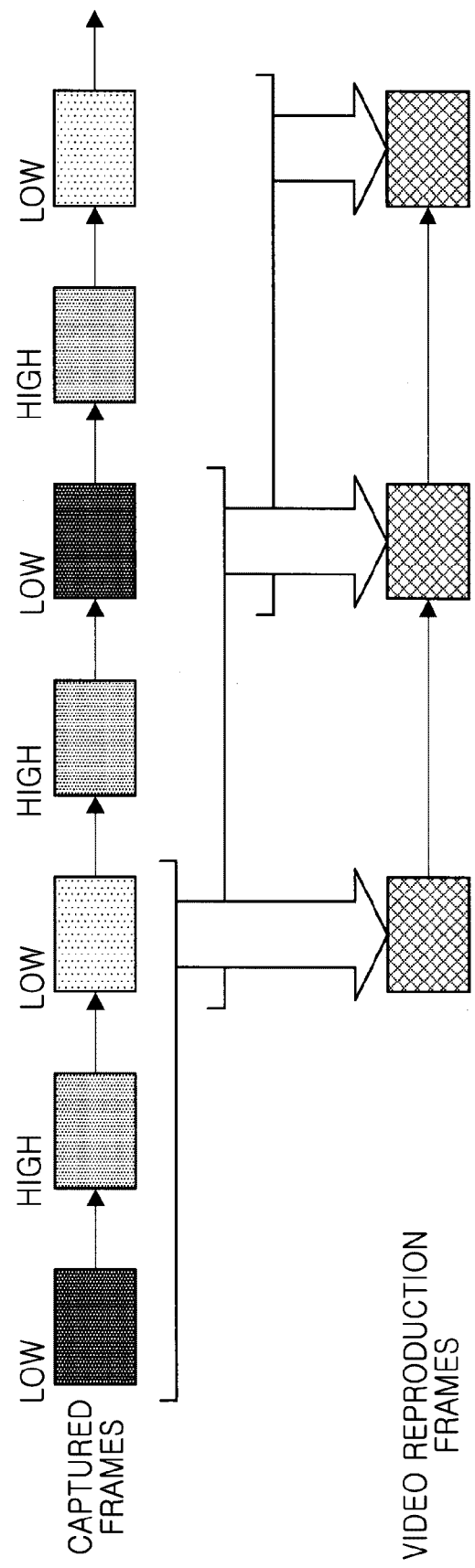

Referring to FIG. 8, images to be synthesized may be assigned different importances with respect to a reference image having a medium or a certain level of brightness. Thus, an image having a brightness close to that of the reference image may have a high importance, and an image brighter or darker than that of the reference image may have a low importance. Images with low levels of importance may be auxiliarily used in HDR synthesis.

The frame generator 139 may prevent a decreased frame rate to perform video reproduction by using more frequently capturing images with a high importance and using less frequently capturing images with a low importance, in association with various image feature controllers 300 and the imaging unit 103. Compared to a conventional image-capturing control method, whereby the frame rate of producing a video is ⅓, an exemplary embodiment of the present general inventive concept increases the frame rate to ½.

Also, the frame generator 139 may suspend production of video reproduction frames when image information changed between image frames exceeds a predetermined threshold. The image information includes an image and an image feature, but is not limited thereto.

Figure 9:
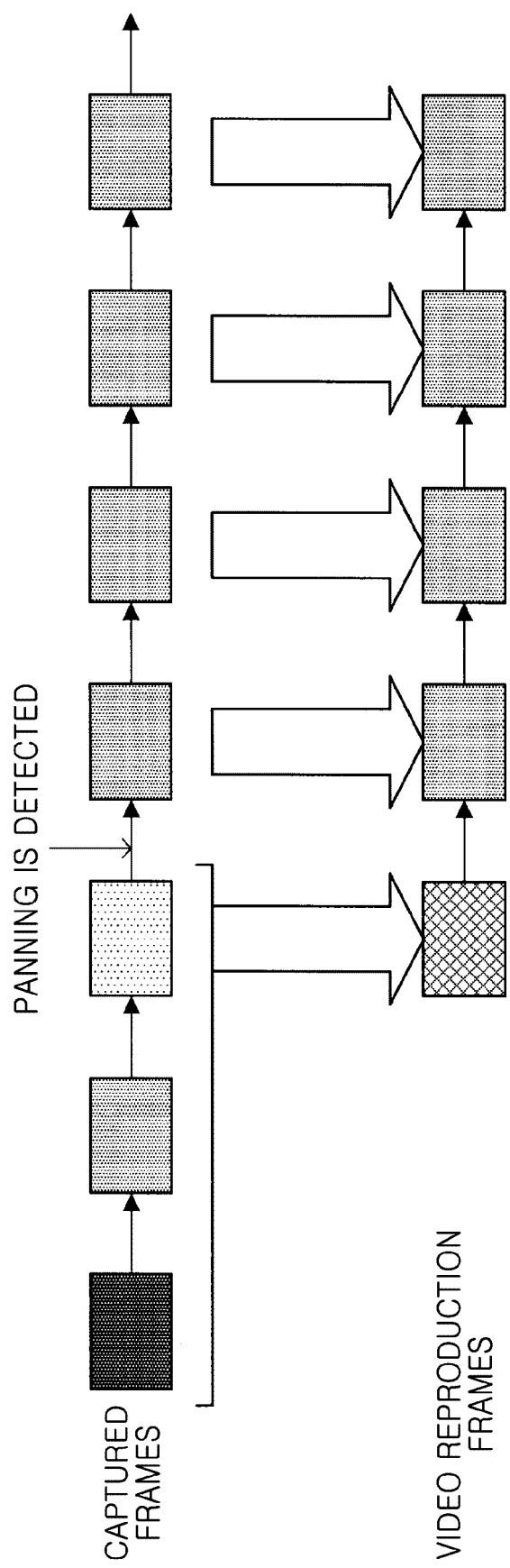

FIG. 9 illustrates a result of video reproduction during a panning operation of the image processing apparatus 10, such that an image is significantly changed between frames, thereby making it difficult to produce video reproduction frames. The frame generator 139 suspends producing video reproduction frames and performs a conventional image-capturing control operation. Accordingly, video reproduction frames that may cause viewers to feel a sense of incompatibility may be prevented in exemplary embodiments of the present general inventive concept.

In the image processing apparatus 10, each element may be configured using conventional-purpose members or circuits, or hardware specialized corresponding to particular functions of these elements. Also, all the functions of these elements may be performed by a CPU or the like, but may not be limited thereto.

The present general inventive concept, such as the method of performing image processing as described above, can also be embodied as computer-readable codes on a computer readable medium. The computer-readable medium can include a computer-recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. The computer-readable transmission medium can transmit carrier functional programs, codes, and code segments to accomplish the present general inventive concept can be easily construed by programmers skilled in the art to which the present general inventive concept pertains Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image processing apparatus, comprising:
    an imaging unit to photograph a subject a plurality of times to obtain a plurality of continuous image frames;
    an image feature controller to adjust image features of the obtained plurality of continuous image frames by controlling the imaging unit;
    a storage unit to store the obtained plurality of continuous image frames; and
    a frame generator to obtain a number of image frames from the stored plurality of continuous image frames and synthesize the obtained number of image frames to sequentially produce video reproduction frames,
    wherein the frame generator uses at least one image frame from the obtained number of image frames to produce at least two video reproduction frames to sequentially produce the video reproduction frames, and
    when a weight is respectively assigned to the number of image frames based on a brightness of the image frames, the frame generator changes the obtaining of the number of image frames according to the respectively assigned weight.

2. The image processing apparatus as claimed in claim 1, wherein the frame generator produces the video reproduction frames using the number of image frames in which at least one of an exposure amount, a depth of field, and a focus point which are image features is changed.

3. The image processing apparatus as claimed in claim 2, wherein the image feature controller adjusts the image features such that image features of the video reproduction frames are monotonously changed.

4. The image processing apparatus as claimed in claim 3, wherein the image feature controller adjusts the image features such that image features of the video reproduction frames are continuously changed.

5. The image processing apparatus as claimed in claim 3, wherein the image feature controller controls exposure amounts of the number of image frames by changing at least one among an exposure time, gain features, an aperture value, and a neutral density (ND) filter.

6. The image processing apparatus as claimed in claim 3, wherein the image feature controller controls the depths of field of the number of image frames by changing an aperture value.

7. The image processing apparatus as claimed in claim 3, wherein the image feature controller controls focus points of the number of image frames by controlling a focus lens included in the imaging unit.

8. The image processing apparatus as claimed in claim 4, wherein the image feature controller controls exposure amounts of the number of image frames by changing at least one among an exposure time, gain features, an aperture value, and a neutral density (ND) filter.

9. The image processing apparatus as claimed in claim 4, wherein the image feature controller controls the depths of field of the number of image frames by changing an aperture value.

10. The image processing apparatus as claimed in claim 4, wherein the image feature controller controls focus points of the number of image frames by controlling a focus lens included in the imaging unit.

11. The image processing apparatus as claimed in claim 1, wherein, when image information is changed between the number of image frames to exceed a threshold, the frame generator suspends production of the video reproduction frame.

12. The image processing apparatus as claimed in claim 1, further comprising a reproduction unit to reproduce the video reproduction frames.

13. An image processing method, comprising:
photographing a subject a plurality of times to obtain a plurality of continuous image frames;
adjusting image features of the obtained plurality of continuous image frames;
storing the obtained plurality of continuous image frames; and
obtaining a number of image frames from the stored plurality of continuous image frames, and synthesizing the obtained number of image frames to sequentially produce video reproduction frames,
wherein the producing of the video reproduction frames comprises using at least one image frame from the obtained number of image frames to produce at least two video reproduction frames to sequentially produce the video reproduction frames, and
when a weight is respectively assigned to the number of image frames based on a brightness of the image frames, changing the obtaining of the number of image frames according to the respectively assigned weight.

14. A non-transitory computer readable recording medium having stored a program code therein to be executed in a computer, wherein a method performed using the program code comprises:
photographing a subject a plurality of times to obtain a plurality of continuous image frames;
adjusting image features of the obtained plurality of continuous image frames;
storing the obtained plurality of continuous image frames; and
obtaining a number of image frames from the stored plurality of continuous image frames, and synthesizing the obtained number of image frames to sequentially produce video reproduction frames,
wherein the producing of the video reproduction frames comprises using at least one image frame from the obtained number of image frames to produce at least two video reproduction frames to sequentially produce the video reproduction frames, and
when a weight is respectively assigned to the number of image frames based on a brightness of the image frames, changing the obtaining of the number of image frames according to the respectively assigned weight.

* * * * *